United States Patent [19]

Dellinger et al.

[11] Patent Number: 5,650,549
[45] Date of Patent: *Jul. 22, 1997

[54] METHOD AND APPARATUS FOR PHOTOTHERMAL DESTRUCTION OF TOXIC ORGANIC COMPOUNDS CONTAINED IN A GAS STREAM

[75] Inventors: Harold Barrett Dellinger, Spring Valley; John L. Graham, Kettering, both of Ohio

[73] Assignee: The University of Dayton, Dayton, Ohio

[*] Notice: The term of this patent shall not extend beyond the expiration date of Pat. No. 5,417,825.

[21] Appl. No.: 461,128

[22] Filed: Jun. 5, 1995

Related U.S. Application Data

[63] Continuation-in-part of Ser. No. 204,073, Mar. 1, 1994, abandoned.

[51] Int. Cl.⁶ .................................................... A62D 3/00
[52] U.S. Cl. .......................... 588/227; 588/207; 588/210; 588/212; 204/157.61; 204/158.2; 204/158.21
[58] Field of Search .................... 204/157.61, 158.2, 204/158.21; 588/207, 210, 212, 227; 422/186, 186.3

[56] References Cited

U.S. PATENT DOCUMENTS

| | | | |
|---|---|---|---|
| 3,977,952 | 8/1976 | Knoevenagel et al. | 204/157.1 R |
| 3,984,296 | 10/1976 | Richards | 204/157.1 R |
| 4,045,316 | 8/1977 | Legan | 204/158 R |
| 4,210,503 | 7/1980 | Confer | 204/158 R |
| 4,432,344 | 2/1984 | Bennington et al. | 126/438 |
| 4,549,528 | 10/1985 | Gibson | 126/438 |
| 4,816,145 | 3/1989 | Goudy, Jr. | 210/96.1 |
| 4,857,277 | 8/1989 | Broomfield | 422/186.07 |
| 4,978,508 | 12/1990 | Hansen et al. | 422/186.08 |
| 4,981,650 | 1/1991 | Brown et al. | 422/24 |
| 5,045,288 | 9/1991 | Raupp et al. | 422/186.3 |
| 5,417,825 | 5/1995 | Graham et al. | 204/158.2 |

OTHER PUBLICATIONS

Graham et al., "High-temp. Thermal Photolytic Oxidation of Monochlorobenzene." *J. Photochem. Photobiol. A: Chem*, 71 (1993) 65–74.

Graham et al., "Solar Thermal/Photolytic Destruct . . . ", *Energy*, vol. 12, No. 314 pp. 303–310, 1987.

D. William Tedder et al., Emerging Technologies in Hazardous Wastes Management II; Atlantic City, NJ. Jun. 4–7, 1990.

John L. Graham, et al.; High-Temperature Thermal-Photolytic Oxidation of Monochlorobenzene; University of Dayton Research Institute; Nov. 5, 1992.

Article—Jonathan Brinckman; Researcher's Light Rays Cook Pollution Away; Dayton Daily News; Mar. 4, 1993.

J.M. Berman et al.; High Temperature UV Absorption Characteristics of Three Environmentally Sensitive Compounds; J. Photochem. Photobiol. A: Chem., 68; Aug. 1992.

J.L. Graham et al.; Solar Thermal/Photolytic Destruction of Hazardous Wastes; University of Dayton Research Institute; 1987.

*Primary Examiner*—Howard E. Schain
*Assistant Examiner*—Cybille Delacroix-Muirheid
*Attorney, Agent, or Firm*—Killworth, Gottman, Hagan & Schaeff

[57] ABSTRACT

A method and apparatus for photothermal detoxification of toxic organic compounds are provided. The apparatus comprises a means for maintaining the gas stream from the targeted source at a temperature of greater than 200° C., an optional air pollution control device, a radiation source which emits radiation at a wavelength of less than 320 nm and an outlet for releasing the nontoxic reaction products to the atmosphere.

13 Claims, 3 Drawing Sheets

METHOD AND APPARATUS FOR PHOTOTHERMAL DESTRUCTION OF TOXIC ORGANIC COMPOUNDS CONTAINED IN A GAS STREAM

CROSS REFERENCE TO RELATED APPLICATIONS

This application is a continuation-in-part of Ser. No. 08/204,073, filed Mar. 1, 1994, now abandoned.

Reference is made to application Ser. No. 08/054,388, filed Apr. 28, 1993, now U.S. Pat. No. 5,417,825, entitled "Method and Apparatus for Photothermal Destruction of Toxic Organic Compounds", the disclosure of which is hereby incorporated by reference.

BACKGROUND OF THE INVENTION

The present invention relates to a method and apparatus for photothermal destruction of toxic organic compounds, particularly those generated during combustion of waste. More particularly, it relates to a process which utilizes high temperatures in combination with radiation exposure to induce a photochemical reaction which completely detoxifies a wide variety of toxic organic compounds contained in a gas stream.

Throughout the industrialized world, there is a growing concern over the impact of industry on the environment, specifically with regard to the increasing emission of contaminants into the atmosphere. According to recent estimates, between 330 and 570 million tons of hazardous waste were generated between 1900 and 1980, and 290 million tons are now produced annually in the United States. Even larger quantities of municipal waste are produced and essentially every U.S. community has some sort of disposal facility or procedure. The level of concentration of such wastes pose health hazards to the general population.

One method of hazardous and municipal waste disposal has been the use of high temperature incineration. Incineration is capable of breaking down a wide variety of toxic materials into carbon dioxide, water, and simple mineral acids. However, this process is very expensive.

In addition, public concern over emission of undestroyed residual components, organic products of incomplete combustion, and off-gas streams laden with organic vapors such as dioxins (or more properly, polychlorinated dibenzo-p-dioxins, PCDDs), have led to regulations by the Environmental Protection Agency, which now requires that a hazardous waste incinerator owner/operator demonstrate a destruction and removal efficiency of 99.99% for the principle organic hazardous components in a waste stream. Polychlorinated biphenyls and polychlorinated dibenzo-p-dioxins are considered so toxic that an efficiency of 99.9999% is required for this class of compounds.

Measurements of emissions from municipal waste incinerators have shown that PCDD and related compounds such as polychlorinated dibenzofurans (PCDFs) are produced during the incineration process and are emitted in environmentally significant quantities. PCDDs are highly toxic chlorinated aromatic hydrocarbons and can include the highly toxic isomer 2,3,7,8 tetrachloro dibenzo-p-dioxin (2,3,7,8 TCDD). Continued concern over PCDD emissions from both hazardous and municipal waste incinerators has prompted the EPA to propose a 30 nanogram/distandard cubic meter emissions limit on all combustion sources as part of its new combustion strategy. Recent research suggests that dioxins are not formed in the combustion zones of the incinerator but are instead formed downstream in the air pollution control devices designed to control gases and particulate matter. Thus, control of dioxin emissions has been extremely difficult.

As a result, there has been extreme interest in developing non-incineration methods for waste treatment. One such method involves treating large volumes of toxic organic wastes with concentrated solar radiation. Sunlight contains both infrared radiation, which can be used to heat the waste, and ultraviolet radiation, which can promote photochemical reactions. However, the unreliability of solar energy limits its use in detoxification processes.

As a result, other more reliable sources of radiation such as high intensity ultraviolet lamps have been employed. For example, U.S. Pat. No. 4,981,650 to Brown et al. discloses the treatment of dioxin contaminated soil or liquid with an activating agent such as 1-hexadecylpyridinium chloride and an alcohol, fatty acid or fat, and then, irradiating with ultraviolet radiation. However, ambient temperatures are maintained during the process, which limits treatment capacity due to the prolonged radiation exposure times required to ensure thorough destruction of the toxic compounds.

Thus, while prior art processes have utilized either heat or radiation to destroy hazardous wastes, none of the processes have used a combination of intense heat and radiation. Although some processes disclose the use of slightly elevated temperatures as well as radiation, such slightly elevated temperatures are a physical requirement, e.g., for the purpose of preventing moisture condensation, and do not effectively aid in the detoxification process itself.

Accordingly, there is still a need in the art for a process which effectively destroys dioxins and other toxic compounds produced during a combustion process.

SUMMARY OF THE INVENTION

The present invention meets that need by providing a thermal/photolytic process for detoxification of toxic organic compounds contained in the gaseous effluent from incinerators, other combustion sources, and even non-combustion sources such as indirect thermal desorbers or catalytic processes. The apparatus is particularly targeted for the destruction of PCDDs, PCDFs, PCBs and other heteroatomic compounds. The apparatus may be attached to the effluent gas stream from most processes and incorporates a source of ultra-violet (UV) radiation and a means of maintaining or heating the gas stream to greater than 200° C. A method for removing particulate matter from the gas stream prior to treatment may be desirable for some sources. In one embodiment of the invention, the radiation source comprises an arc lamp selected from the group consisting of xenon, mercury, and xenon-mercury. In an alternative embodiment, the radiation source comprises a pulsed or continuous laser. Other sources of ultraviolet light such as flash lamps may also be used.

In order to maintain an acceptable minimum operating efficiency it is necessary to maintain the gas stream at greater than 200° C. and expose the gas stream to radiation at a wavelength of less than 320 nm. To obtain maximum destruction efficiency of a toxic compound, the compound is preferably heated to a temperature of between 400° to 600° C. and is exposed to radiation of between about 220 and 300 nm, and most preferably between about 220 and 280 nm, for at least one second, and more preferably from about 5 to 10 seconds. For the embodiment utilizing an arc lamp, the radiation is preferably emitted at greater than about 40

W/cm$^2$, and more preferably greater than about 100 W/cm$^2$. If a laser is used as the source, the radiation is preferably emitted at greater than about 0.01 W/cm$^2$, and more preferably greater than about 1 W/cm$^2$. The resulting nontoxic reaction products may then be emitted harmlessly to the atmosphere.

Accordingly, it is an object of the present invention to provide a method and apparatus for photothermal detoxification of toxic organic compounds contained in a gas stream. This, and other objects and advantages of the present invention, will become apparent from the following detailed description, the accompanying drawings, and the appended claims.

DETAILED DESCRIPTION OF THE PREFERRED EMBODIMENTS

The apparatus and method of the present invention differ from the prior art processes which are designed to process liquids, such as contaminated water, at low temperatures. Under such conditions, the detoxification reactions proceed slowly, which severely limits the treatment capacity. The apparatus of the present invention, however, is designed to process gas streams at higher temperatures using radiation at a lower wavelength range, which allows the photochemical reaction to proceed at an extremely high rate. This photothermal exposure results in a fewer number of by-products having lower yield and lower molecular weights than the by-products produced by lower temperature processes.

Figure 1:
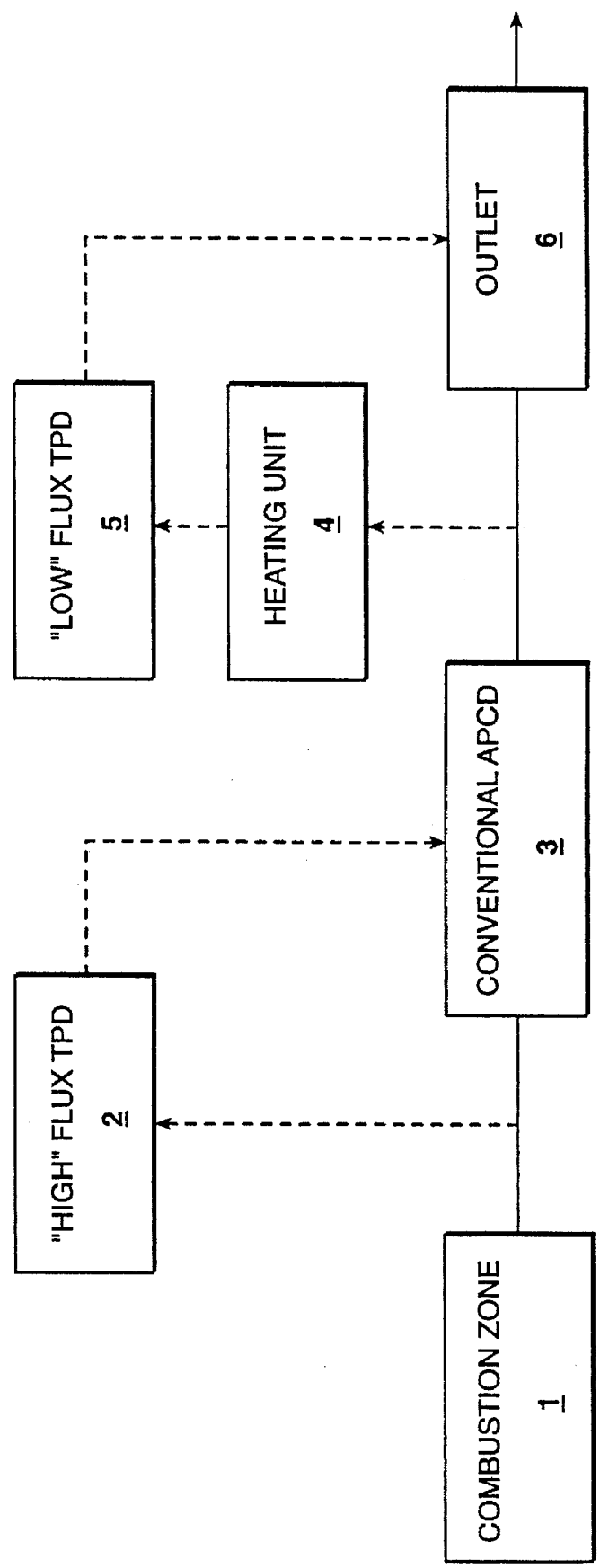
FIG. 1 is a schematic diagram of the Thermal/Photolytic Destructor (TPD) process configurations.

Referring now to FIG. 1, one embodiment of the apparatus of the present invention is illustrated in schematic form. In this embodiment, the apparatus is used to control toxic organic emissions from a combustion zone 1. Destruction of PCDD and PCDF emissions from a standard municipal waste incinerator station operating at normal temperature and pressure may be considered a particularly pertinent example. The gas stream will carry the combustion by-products at a temperature of about 300°–700° C. to the first of two possible positions for the thermal/photolytic destructor (TPD), the "high" flux TPD 2. The TPD generates radiation which, in combination with the high temperatures, initiates a breakdown of the toxic organic compounds into non-toxic reaction products. For the treatment to be effective, the toxic compounds should be exposed to the radiation for at least one second, preferably 5 to 10 seconds. The TPD radiation source may comprise arc emission sources such as xenon, mercury, or xenon-mercury lamps, or the source may comprise a pulsed or continuous laser. The preferred operating parameters of these radiation sources are listed in Table 3. Such sources of radiation are capable of going further into the UV region than solar radiation, which results in greater efficiency of the detoxification reaction. Other available sources of ultraviolet radiation may be used as long as they provide the required radiation.

The first possible position for the TPD is identified as "high" flux because the gas stream at that point in the apparatus contains a high percentage of particulate matter. This particulate matter interferes with the UV radiation, which relies on optical penetration, and a greater flux is required to effectively destroy the toxic compounds. The second possible position for the TPD, "low" flux TPD 5, does not require a high UV flux because most of the particulate matter is removed by the air pollution control device (conventional APCD 3). Examples of APCDs which can be used in this capacity are electrostatic precipitators and "baghouses". While a lower UV flux can be used with the "low" flux TPD 5, the gas stream may cool to a temperature of less than 200° C. as it passes through the APCD. If this occurs, a heating unit 4 (such as a gas burner or a heat transfer utilizing heat from lower down the stack) is used to heat the gas stream to a temperature of greater than 200° C. prior to treatment by the "low" flux TPD 5. After treatment by the "low" flux TPD 5, the gas stream proceeds to an outlet 6 for release to the atmosphere. Also, a system/process performance monitor may be installed before the outlet to monitor the gas being released into the atmosphere and the overall performance of the system in removing toxic compounds.

The position of the TPD in the apparatus is determined by the type of pollutants targeted for control. To control primarily combustion by-products, the TPD is located before the APCD. However, if pollutants such as polychlorinated dibenzo-p-dioxins (PCDD) and polychlorinated dibenzofurans (PCDF) are targeted, the TPD is located after the APCD. The reason for this is that PCDDs and PCDFs are probably formed within the conventional APCDs. Therefore, the TPD must be positioned after the APCD to effectively control PCDD and PCDF emissions.

In order that the invention may be more readily understood, reference is made to the following examples, which are intended to illustrate the invention, but are not to be taken as limiting the scope thereof.

EXAMPLE 1

Liquid chlorobenzene was treated in a gas-phase, oxidative environment with one of two different high temperature flow reactor systems. The systems both exposed chlorobenzene to high temperatures, but one system also exposed the chlorobenzene to a radiation source. The radiation source was a tunable, pulsed laser system comprising a Nd:YAG laser (Continuum, Model 682-20) coupled to a dye laser (Continuum, Model TDL-51). The system was operated with 20 pulses/sec delivering an average power of 883 mW/cm$^2$ at 280 nm.

The reactor system consisted of a thermally insulated enclosure that houses a sample inlet system and a high temperature absorption cell. The sample inlet system consists of two channels, one dedicated to gases and liquids, the other for solids, that are heated to insure rapid volatilization of the samples (typically 300° C.). Gases and liquids may be introduced continuously, while solids are introduced in a batch operation using special probes. The absorption cell is a 12×200 mm cylinder surrounded by a small tube heater which in turn lies along the center line of a conduit which provides optical access. To minimize sample decomposition, spectra are taken in an inert atmosphere (typically helium) and a mean residence time of <1.0 s.

A stock sample of chlorobenzene was prepared by injecting 45.3 μL of liquid (Aldrich, 99.99%, HPLC Grade) into a 1 L sample bulb. For each analysis, 2,000 μL of the stock sample was injected at a constant rate of 20.3 μL/s for a period of approximately 100 seconds. Since the flow rate of carrier gas was adjusted to maintain a constant mean residence time over the temperature range studied, and the flow rate of sample was also constant, the mean concentration of chlorobenzene in the reactor was $2.95 \times 10^{-6}$ mol/L at each temperature, while the concentration of oxygen in the reactor varied from $2,080 \times 10^{-6}$ mol/L at 300° C. to $1,230 \times 10^{-6}$ mol/L at 700° C. Therefore, the fuel/air equivalence ratio varied from 70 at 300° C. to 41 at 700° C.

A cryogenic trap was cooled to −160° C. to collect the organic components of the reactor effluent. When the collection was complete, the trap was heated to 350° C., releasing the collected material to an in-line gas chromatograph for analysis. The gas chromatograph was fitted with a hydrogen flame ionization detector and mass selective detector (Hewlett-Packard, Model 5970) which was operated in a scanning mode (10 to 200 AMU).

The results, which demonstrate the thermal and thermal/photolytic decomposition of chlorobenzene and associated carbon containing products, are summarized in Tables 1 and 2. The data clearly demonstrate an increase in the rate of decomposition of chlorobenzene via the thermal/photolytic pathways versus those induced by purely thermal exposure. Also, thermal/photolytic exposure resulted in a fewer number of by-products which were of lower yield, lower molecular weight and decomposed at lower temperatures.

EXAMPLE 2

A series of tests were conducted in which 1,2,3,4-tetrachlorodibenzo-p-dioxin (TCDD) was exposed to thermal and photothermal conditions using unfiltered xenon arc radiation. This data was compared to similar tests conducted with simulated sunlight. This data was taken with 0 (thermal) and 17.6 W/cm$^2$ of xenon arc radiation and with 40.0 W/cm$^2$ of simulated terrestrial solar radiation. Both sets of data were taken with an initial TCDD concentration on the order of $10^{-5}$ mol/l and a mean reactor residence time of 10.0 s. in air.

Figure 2:
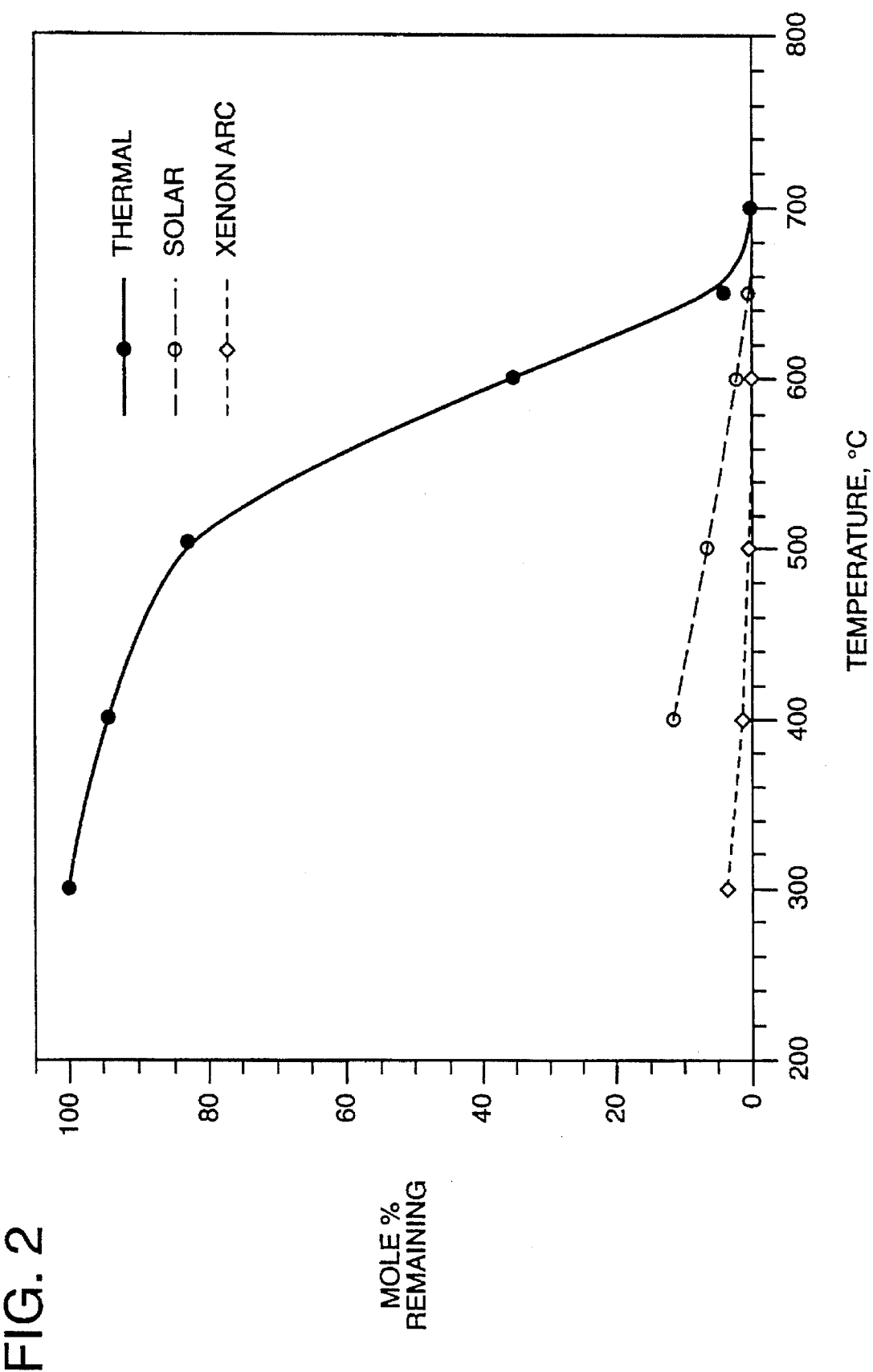
FIG. 2 is a graph of the thermal and photothermal decomposition data for 1,2,3,4-tetrachlorodibenzo-p-dioxin.

The data from the TCDD tests is summarized in Table 3 and FIG. 2. These data clearly illustrate the effectiveness of the photothermal process in destroying this compound. For example, at 500° C. only 17% of the TCDD was destroyed thermally, while over 99% was destroyed by the exposure to xenon arc emission. Furthermore, the xenon arc exposure was far more efficient at destroying the TCDD even though the overall radiant intensity was less than half that of the simulated solar exposure. This clearly illustrates the benefit of using short wavelength UV with wavelengths as short as 230 nm available from the xenon arc as compared to 300 nm in terrestrial solar radiation.

Figure 3A:
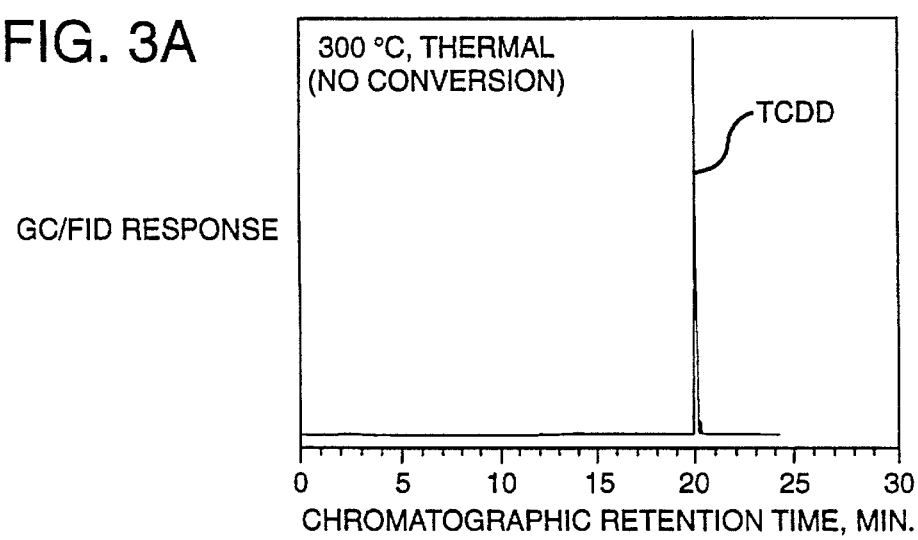
FIG. 3 shows example chromatogram readings of the thermal and photothermal decomposition data for 1,2,3,4-tetrachlorodibenzo-p-dioxin.
Figure 3B:
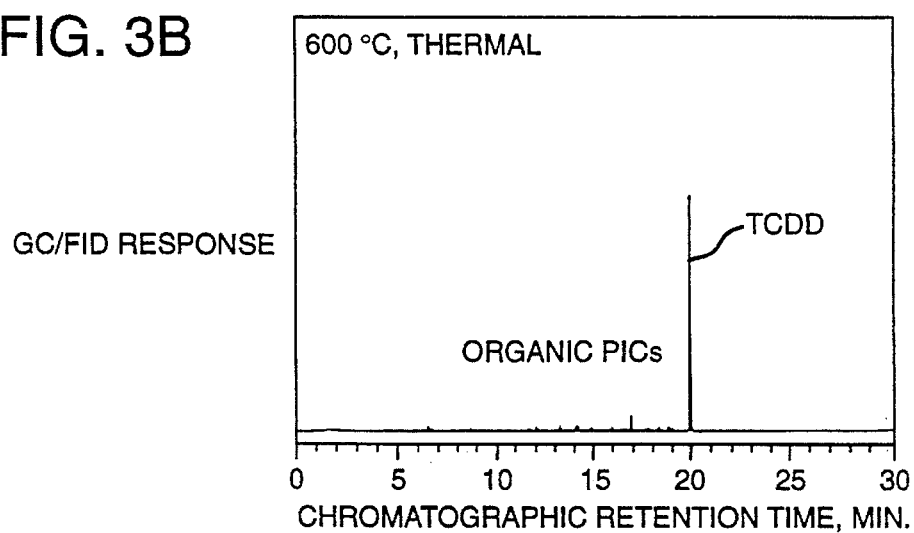
Figure 3C:
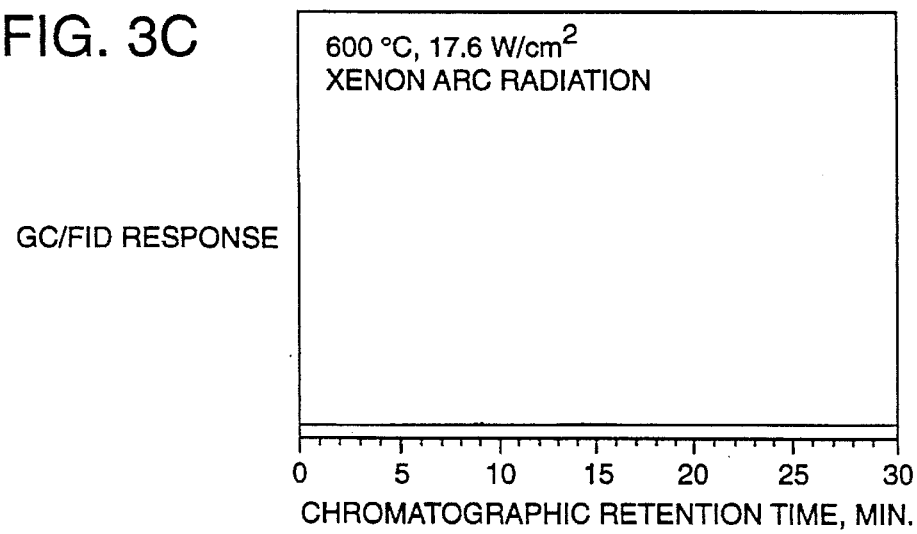

The ability of the photothermal process to completely mineralize the waste feed can be shown by examining the original chromatographic data. The chromatographic traces from a thermal exposure at 300° C. (100% remaining), 600° C. (35.4% remaining), and a photothermal exposure at 600° C. (0.0285% remaining) are summarized in FIG. 3. The 600° C. thermal data shows the production of numerous products of incomplete combustion (PICs) which often accompany the thermal decomposition of organic compounds. The photothermal trace clearly shows that not only is the parent TCDD destroyed under these conditions, but nearly all of the associated products as well. This emphasizes that the photothermal process differs significantly from conventional photochemical processes in that the decomposition reactions lead to the complete mineralization of the waste feed.

The operating parameters of a variety of radiation sources for use in the present invention are listed in Table 4.

TABLE 1

Summary of the Thermal Oxidation Data for Chlorobenzene and its Major Products Given as a Mole % Referenced to the Original Amount of Chlorobenzene[1]

| | Temperature, °C. | | | | | | | | |
|---|---|---|---|---|---|---|---|---|---|
| | 300 | 400 | 500 | 600 | 650 | 675 | 690 | 700 | 710 |
| Chlorobenzene (Parent)[2] | 100 | 96.6 | 94.9 | 92.9 | 88.6 | 71.6 | 52.7 | 27.6 | 1.23 |
| Carbon monoxide | | | | | 45.9 | 138 | 388 | 488 | 573 |
| Carbon dioxide | | | | | 5.30 | 11.2 | 41.4 | 68.76 | 94.6 |
| 1-Butene-3-yne[3] | | | | 0.680 | 1.64 | 1.43 | 1.40 | 0.586 | |
| 1-Ethynyl-4-methyl-benzene[4] | | | | | 0.102 | 4.67 | 0.093 | 0.081 | |
| 2-Methyl-naphthalene[2] | | | | | 0.146 | 2.45 | 0.136 | | |
| 1-Methyl-naphthalene[2] | | | | | | 1.65 | 0.130 | | |
| 1-Propenyl-benzene[4] | | | | | | 1.34 | | | |
| 2-Chlorophenol[2] | | | | 0.165 | 1.33 | 1.90 | 1.36 | 0.327 | |
| 3-Chlorophenol[2] | | | | 0.106 | 1.49 | 1.84 | 1.33 | 0.284 | |
| Acenaphthalene[2] | | | | | | 1.11 | | | |
| Benzene[2] | | | | | 0.239 | 0.735 | 0.689 | 0.248 | 0.141 |
| Naphthalene[2] | | | | | | 4.67 | | | |
| Phenol[2] | | | | 0.085 | 1.54 | 2.48 | 1.55 | 0.172 | |
| Total Carbon Recovered[5] | 100% | 96.6% | 94.9% | 93.3% | 103% | 131% | 131% | 122% | 113% |

[1]Mole % remaining of species i at temperature T = Moles $_T$(i)/Moles$_{300}$(ClBz) × 100%
[2]Quantified by analytical standard
[3]Quantified as butadiene
[4]Quantified as ethynylbenzene
[5]Sum of the total carbon measured in the output normalized by the total carbon input (5,343 nMol).

TABLE 2

Summary of the Thermal/Photolytic Oxidation Data for Chlorobenzene and its Major Products Given as a Mole % Referenced to the Original Amount of Chlorobenzene[1]

| | Temperature, °C. | | | | | | | |
|---|---|---|---|---|---|---|---|---|
| | 300 | 400 | 500 | 600 | 625 | 650 | 675 | 700 |
| Chlorobenzene (Parent)[2] | 69.8 | 47.8 | 38.5 | 24.7 | 13.5 | 8.36 | 0.895 | 0.00201 |
| Carbon monoxide | 203 | 356 | 465 | 516 | 564 | 612 | 565 | 518 |
| Carbon dioxide | 58.4 | 52.4 | 73.8 | 79.7 | 79.7 | 79.6 | 91.2 | 103 |
| 2(3H)-Furanone[3] | 0.447 | 0.647 | 0.207 | | | | | |
| Maleic Anhydride[2] | 1.22 | 2.31 | 1.71 | 0.125 | | | | |
| 2-Chlorophenol[2] | 0.685 | 0.354 | | | | | | |
| Benzene[2] | 0.312 | 0.612 | 0.50 | 0.564 | 0.211 | | | |
| Phenol[2] | 8.60 | 6.28 | 2.68 | 0.869 | 0.178 | | | |
| Total Carbon Recovered[5] | 124% | 126% | 133% | 126% | 121% | 124% | 110% | 104% |

[1]Mole % remaining of species i at temperature T = Moles$_T$(i)/Moles$_{300}$(ClBz) × 100%
[2]Quantified by analytical standard. Two GC peaks were observed that were identified as maleic anhydride.
[3]Quantified as 2H-Pyranone
[4]Sum of the total carbon measured in the output normalized by the total carbon input (5,343 nMol).

TABLE 3

Summary of Data for 1,2,3,4-Tetrachlorodibenzo-p-dioxin Exposed to Purely Thermal Conditions, 40.0 W/cm$^2$ Simulated Solar Radiation, and 17.6 W/cm$^2$ Xenon Arc Radiation for 10.0 sec. in Air[1]

| Temp (°C.) | Thermal | Solar[3] | Xenon Arc[2] |
|---|---|---|---|
| 300 | 100 | — | 3.59 |
| 400 | 94.1 | 11.5 | 1.31 |
| 500 | 83.0 | 6.63 | 0.394 |
| 600 | 35.4 | 2.19 | 0.0285 |
| 650 | 3.92 | 0.415 | — |
| 700 | 0.242 | 0.0425 | — |

[1]Data are given as mole % remaining based on chromatographic response.
[2]Xenon arc lamp exposures
[3]Simulated solar exposures

TABLE 4

Operating Parameters of Thermal/Photolytic Destructor Radiation Sources

| Parameter | Minimum Specification | Preferred Specification |
|---|---|---|
| Residence Time | 1.0 seconds | 5.0–10.0 seconds |
| Temperature | 200° C. | 400–600° C. |
| UV flux for: | | |
| CW or pulsed Xenon arc at 220–320 nm (wavelength) | 40 W/cm$^2$ | ≧100 W/cm$^2$ |
| Hg arc at 254 nm | 40 W/cm$^2$ | ≧100 W/cm$^2$ |
| Ar F excimer laser at 193 nm | 0.01 W/cm$^2$ | ≧1 W/cm$^2$ |
| Kr F excimer laser at 222 nm | 0.05 W/cm$^2$ | ≧1 W/cm$^2$ |
| Kr F excimer laser at 248 nm | 0.01 W/cm$^2$ | ≧1 W/cm$^2$ |
| Xe Cl excimer laser at 193 nm | 0.1 W/cm$^2$ | ≧1 W/cm$^2$ |
| Frequency Tripled Nd:YAG laser at 355 nm | 0.2 W/cm$^2$ | ≧2 W/cm$^2$ |

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A photothermal process for the detoxification of chlorinated aromatic hydrocarbons contained in a gas stream comprising the steps of:
   heating chlorinated aromatic hydrocarbons to a temperature of greater than 200° C. to form a gas stream or maintaining a pre-existing chlorinated aromatic hydrocarbon containing gas stream produced from a combustion source at a temperature of greater than 200° C.;
   exposing said gas stream to radiation at a wavelength of less than 280 nm for at least one second to convert said chlorinated aromatic hydrocarbons in said gas stream to nontoxic reaction products, and releasing said gas stream to the atmosphere.

2. The process of claim 1 wherein said radiation is emitted from an arc lamp selected from the group consisting of xenon, mercury, and xenon-mercury.

3. The process of claim 2 wherein said radiation is emitted at greater than about 40 W/cm$^2$.

4. The process of claim 1 wherein said radiation is emitted from a pulsed or continuous laser.

5. The process of claim 4 wherein said radiation is emitted at greater than about 0.01 W/cm$^2$.

6. The process of claim 1 wherein said gas stream is exposed to radiation for about 5 to 10 seconds.

7. The process of claim 1 further including the step of passing said gas stream through an air pollution control device to substantially remove particulate matter from said gas stream.

8. The process of claim 7 wherein said gas stream is exposed to radiation prior to passing through said air pollution control device.

9. The process of claim 7 wherein said gas stream is exposed to radiation after passing through said air pollution control device.

10. The process of claim 7 wherein said gas stream is exposed to a separate radiation source both prior to passing through said air pollution control device and after passing through said air pollution control device.

11. The process of claim 1 wherein said gas stream is maintained at 400° to 600° C.

12. The process of claim 1 wherein said gas stream is exposed to radiation at wavelengths from about 220 to 280 nm.

13. The process of claim 1 wherein said chlorinated aromatic hyrocarbons comprise polychlorinated dibenzo-p-dioxins and polychlorinated dibenzofurans.

* * * * *